United States Patent
Lopez, Jr. et al.

(10) Patent No.: US 8,490,762 B2
(45) Date of Patent: Jul. 23, 2013

(54) MAGNETORHEOLOGICAL (MR) PISTON RING AND MR DAMPER HAVING SAME

(75) Inventors: James Louis Lopez, Jr., Dayton, OH (US); Jaroslaw S Skarbek, Krakow (PL)

(73) Assignee: BWI Company Limited S.A., Luxembourg (LU)

( * ) Notice: Subject to any disclaimer, the term of this patent is extended or adjusted under 35 U.S.C. 154(b) by 0 days.

(21) Appl. No.: 13/396,054

(22) Filed: Feb. 14, 2012

(65) Prior Publication Data
US 2012/0138399 A1    Jun. 7, 2012

Related U.S. Application Data

(62) Division of application No. 12/231,905, filed on Sep. 5, 2008, now Pat. No. 8,141,689.

(60) Provisional application No. 60/998,141, filed on Oct. 9, 2007.

(51) Int. Cl.
*F16F 9/53* (2006.01)

(52) U.S. Cl.
USPC .................. 188/267.2; 188/322.15

(58) Field of Classification Search
USPC 188/267.2, 267, 322.15, 322.22; 267/140.14, 267/140.15
See application file for complete search history.

(56) References Cited

U.S. PATENT DOCUMENTS

| | | | |
|---|---|---|---|
| 3,747,714 A * | 7/1973 | DeCarbon | 188/317 |
| 5,070,971 A | 12/1991 | Dourson et al. | |
| 6,318,519 B1 | 11/2001 | Kruckemeyer et al. | |
| 6,318,520 B1 | 11/2001 | Lisenker et al. | |
| 6,464,049 B2 | 10/2002 | Lisenker | |
| 6,928,923 B2 * | 8/2005 | May | 92/248 |
| 8,141,689 B2 | 3/2012 | Lopez et al. | |
| 8,327,984 B2 * | 12/2012 | Foister et al. | 188/267.2 |
| 2010/0006381 A1 | 1/2010 | Lee et al. | |

FOREIGN PATENT DOCUMENTS
KR    1020060121586 A    11/2006

* cited by examiner

*Primary Examiner* — Pamela Rodriguez
(74) *Attorney, Agent, or Firm* — Dickinson Wright PLLC

(57) ABSTRACT

A magnetorheological (MR) piston ring includes an MR-piston-ring body disposable within a cylinder of an MR damper along a central longitudinal axis. The MR-piston-ring body has a radially inner surface defining a boundary of a longitudinally-extending MR passageway. The MR-piston-ring body includes a surface portion which is slidingly engagable with the cylinder and which has first and second longitudinal ends. The surface portion includes at least one surface groove each defining a secondary MR passageway and extending between the first and the second longitudinal ends. The surface groove is substantially straight and tilted with respect to a line drawn on the surface portion parallel to the central longitudinal axis. An MR damper including the MR piston ring is also described.

17 Claims, 8 Drawing Sheets

MAGNETORHEOLOGICAL (MR) PISTON RING AND MR DAMPER HAVING SAME

CROSS REFERENCE TO RELATED APPLICATIONS

The present application claims priority of U.S. Provisional Application No. 60/998,141 filed Oct. 9, 2007 and is a divisional application of U.S. application Ser. No. 12/231,905, now U.S. Pat. No. 8,141,689 entitled, "Magnetorheological (MR) Piston Ring With Lubricating Grooves", filed Sep. 8, 2008.

TECHNICAL FIELD

The present invention relates generally to piston dampers, and more particularly to a magnetorheological (MR) piston ring and to an MR damper having an MR piston ring.

BACKGROUND OF THE INVENTION

Conventional piston dampers include MR dampers having a tube containing an MR fluid and having an MR piston assembly including a piston which slideably engages the tube and including a rod which has a first end attached to the piston and a second end extending outside the tube. The MR fluid passes through an MR passageway (i.e., a magnetically energizable passageway) of the MR piston. Exposing the MR fluid in the MR passageway to a varying magnetic field, generated by providing a varying electric current to an electric coil of the MR piston, varies the damping effect of the MR fluid in the MR passageway providing variably-controlled damping of relative motion between the MR piston and the tube. The electric current is varied (including turning off the electric current) to accommodate varying operating conditions, as is known to those skilled in the art. The tube and the rod are attached to separate structures to dampen relative motion of the two structures along the direction of piston travel. In one known application, the MR damper is employed as a vehicle suspension damper to control vehicle ride and handling including damping during jounce and rebound.

A known design includes an MR piston having an MR piston core, two MR piston end plates, and an MR piston ring. The two MR piston end plates are attached one each to the two longitudinal ends of the MR piston core. The MR piston ring is attached to the MR piston end plates and is radially-outwardly spaced apart from the MR piston core to define an MR passageway between the MR piston core and the MR piston ring. An MR passageway is a magnetically energizable passageway. An electric coil is located in the MR piston core to magnetically energize MR fluid in the MR passageway. The MR piston core may include an MR bypass passageway (i.e., a magnetically non-energizable passageway) radially inward of the MR passageway and the electric coil. The outer circumference of the metal MR piston ring slidingly engages the inner circumference of the metal tube of the MR damper. Excessive wear on the sliding metal surfaces occurs when high side loads are applied to the MR damper.

What is needed is an improved magnetorheological piston ring and an improved magnetorheological damper having an MR piston ring.

SUMMARY OF THE INVENTION

A first expression of a first embodiment of the invention is for a magnetorheological (MR) damper including an MR piston core, first and second MR piston end plates, a cylinder, and an MR piston ring. The piston core has a central longitudinal axis. The MR piston core is disposed longitudinally between and attached to the first and second MR piston end plates. The MR piston ring is substantially coaxially aligned with the longitudinal axis, is disposed within the cylinder, is attached to the first and second MR piston end plates, and is radially-outwardly spaced apart from the MR. piston core to define a primary MR passageway between the MR piston core and the MR piston ring. The MR piston ring includes a surface portion which is slidingly engagable with the cylinder and which has first and second longitudinal ends. The surface portion includes at least one surface groove each defining a secondary MR passageway and extending from the first longitudinal end to the second longitudinal end.

A second expression of a first embodiment of the invention is for a magnetorheological (MR) piston ring including an MR-piston-ring body disposable within a cylinder of an MR damper and having a central longitudinal axis. The MR-piston-ring body has a radially inner surface defining a boundary of a longitudinally-extending primary MR passageway. The MR-piston-ring body includes a surface portion which is slidingly engagable with the cylinder and which has first and second longitudinal ends. The surface portion includes at least one surface groove each defining a secondary MR passageway and extending from the first longitudinal end to the second longitudinal end.

A first expression of a second embodiment of the invention is for a magnetorheological (MR) damper including an MR piston core, first and second MR piston end plates, a cylinder, and an MR piston ring. The MR piston core has a central longitudinal axis. The MR piston core is disposed longitudinally between and attached to the first and second MR piston end plates. The MR piston ring is substantially coaxially aligned with the longitudinal axis, is disposed within the cylinder, is attached to the first and second MR piston end plates, and is radially-outwardly spaced apart from the MR piston core to define a primary MR passageway between the MR piston core and the MR piston ring. The MR piston ring includes a surface portion which is slidingly engagable with the cylinder and which has first and second longitudinal ends. The surface portion includes at least one surface groove each defining an MR cavity and extending from one of the first and second longitudinal ends toward, but not to, the other of the first and second longitudinal ends.

A second expression of a second embodiment of the invention is for a magnetorheological (MR) piston ring including an MR-piston-ring body disposable within a cylinder of an MR damper and having a central longitudinal axis. The MR-piston-ring body has a radially inner surface defining a boundary of a longitudinally-extending MR passageway. The MR-piston-ring body includes a surface portion which is slidingly engagable with the cylinder and which has first and second longitudinal ends. The surface portion includes at least one surface groove each defining an MR cavity and extending from one of the first and second longitudinal ends toward, but not to, the other of the first and second longitudinal ends.

Several benefits and advantages are derived from one or more of the expressions of the first and second embodiments of the invention. In one example, the surface portion of MR piston ring which is slidingly engagable with the cylinder is lubricated by MR fluid in the at-least-one surface groove of the surface portion. Such lubrication of the surface portion reduces wear on the sliding surfaces when high side loads are applied to the MR damper.

DETAILED DESCRIPTION

Figure 1:
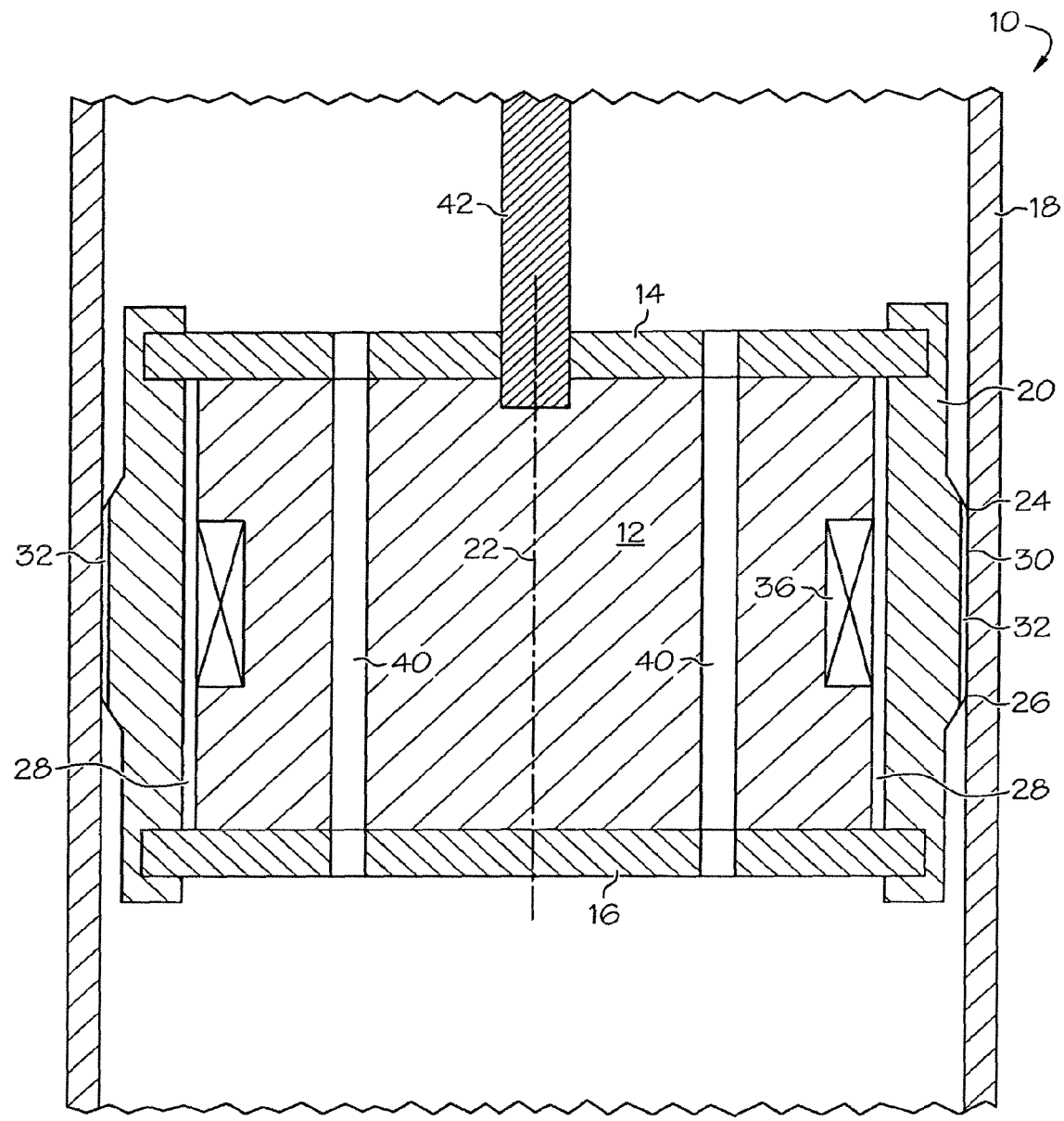
FIG. 1 is a schematic, cross-sectional view of a first embodiment of the invention showing a portion of an MR damper including an MR piston having an MR piston ring.
Figure 2:
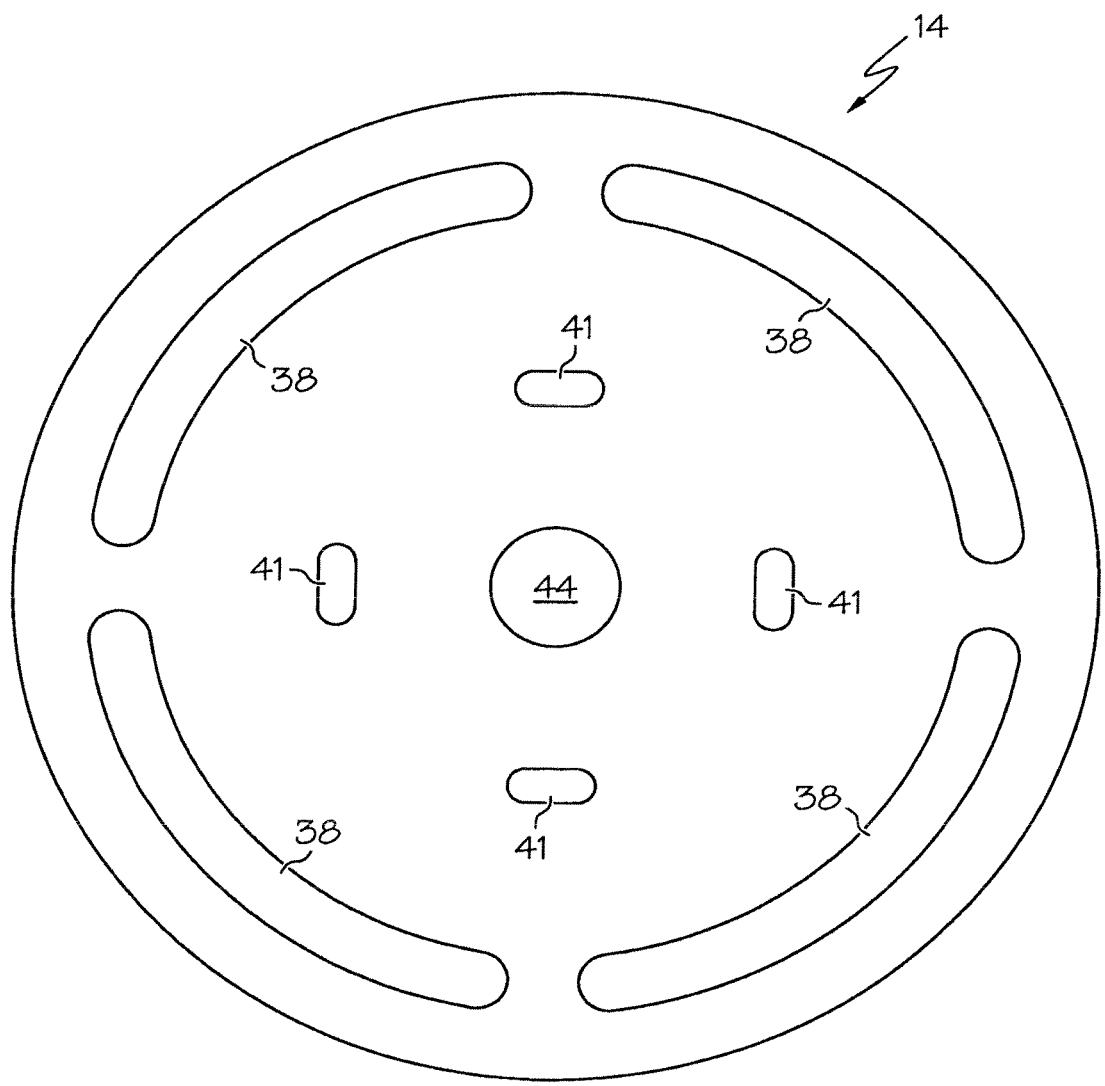
FIG. 2 is a longitudinal head-on view of the proximal end of the first MR piston end plate removed from the MR piston of FIG. 1.

It is noted that like parts are numbered alike throughout the figures. Referring now to the drawings, FIGS. 1-5 show a first embodiment of the present invention. A first expression of the embodiment of FIGS. 1-5 is for a magnetorheological (MR) damper 10 including an MR piston core 12, first and second MR piston end plates 14 and 16, a cylinder 18, and an MR piston ring 20. The piston core 12 has a central longitudinal axis 22. The MR piston core 12 is disposed longitudinally between and attached to the first and second MR piston end plates 14 and 16. The MR piston ring 20 is substantially coaxially aligned with the longitudinal axis 22, is disposed within the cylinder 18, is attached to the first and second MR piston end plates 14 and 16, and is radially outwardly spaced apart from the MR piston core 12 to define a primary MR passageway 28 between the MR piston core 12 and the MR piston ring 20. The MR piston ring 20 includes a surface portion 30 which is slidingly engagable with the cylinder 18 and which has first and second longitudinal ends 24 and 26. The surface portion 30 includes at least one surface groove 32 each defining a secondary MR passageway 34 and extending from the first longitudinal end 24 to the second longitudinal end 26.

Figure 3:
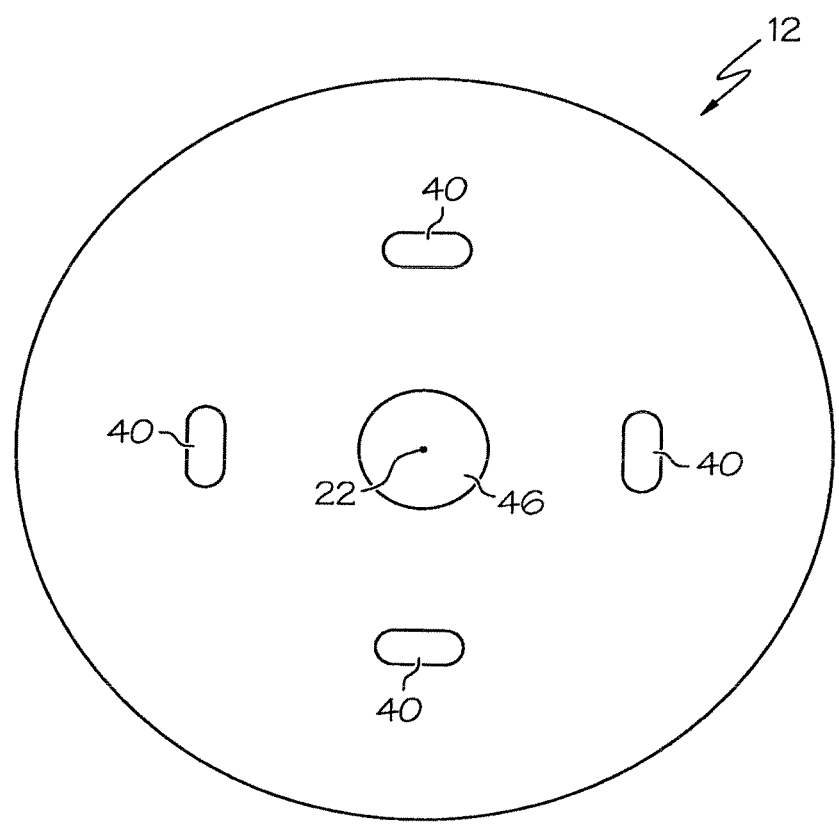
FIG. 3 is a longitudinal head-on view of the proximal end of the MR piston core removed from the MR piston of FIG. 1.

It is noted that an MR passageway is a magnetically energizable passageway. In one construction of the first expression of the embodiment of FIGS. 1-5, an electric coil 36 is disposed in the MR piston core 12 and is adapted to magnetically energize MR fluid (not shown) in the primary and secondary MR passageways 28 and 34. Two of four primary MR passageways 28 are shown in FIG. 1. Each primary MR passageway 28 is aligned respectively with an orifice of each of the first and second MR piston end plates 14 and 16 (note there are four orifices 38 shown for the first MR piston end plate 14 in FIG. 2). In one variation, as shown in FIG. 3, the MR piston core 12 has four non-MR passageways 40 (only two of which are shown in FIG. 1). Each non-MR passageway 40 is a non magnetically energizable passageway which essentially is not magnetically influenced by the disposed electric coil 36. Each non-MR passageway 40 is aligned respectively with an aperture of each of the first and second MR piston end plates 14 and 16 (note there are four apertures 41 shown for the first MR piston end plate 14 in FIG. 2).

In one arrangement of the first expression of the embodiment of FIGS. 1-5, a piston rod 42 extends through a through hole 44 in the first MR piston end plate 14 and into a non-through hole 46 in the MR piston core 12 and is attached to the MR piston core 12. The combination of the MR piston core 12, the first and second MR piston end plates 14 and 16, and the MR piston ring 20 is referred to as a piston. The combination of the piston and the piston rod 42 is referred to as a piston assembly. In one application, an external spring (not shown) surrounds the cylinder 18 of the MR damper 10 to create a strut as is known to those skilled in the art.

Figure 4:
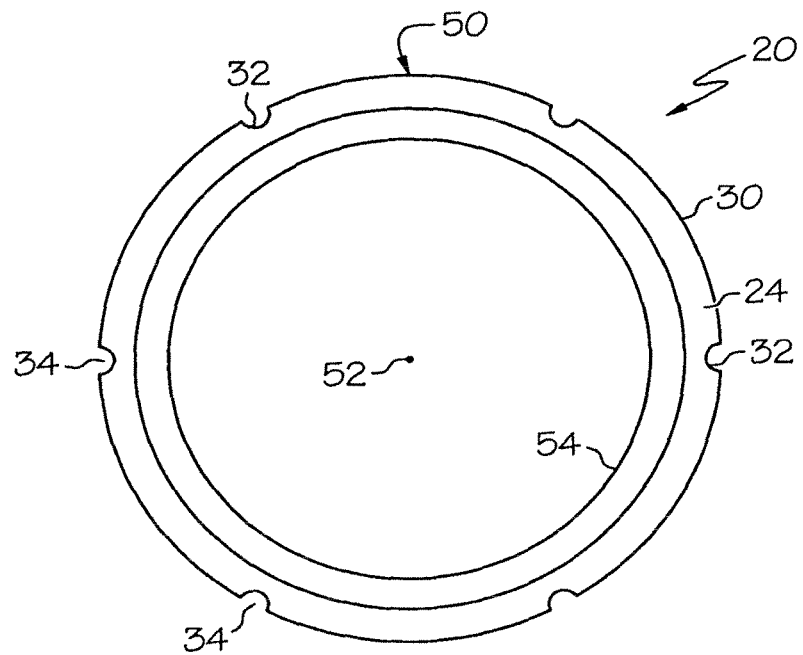
FIG. 4 is a longitudinal head-on view of the proximal end of the MR piston ring removed from the MR piston of FIG. 1.
Figure 5:
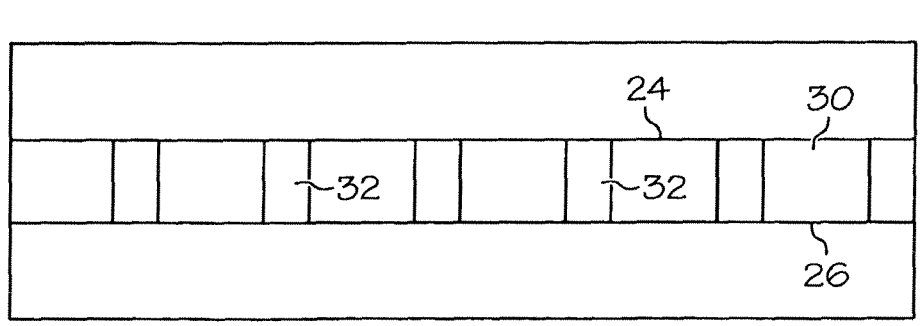
FIG. 5 is a view of the outer surface of the MR piston ring of FIG. 1 wherein the outer surface, including the surface portion which is slidingly engagable with the cylinder, is viewed as being longitudinally cut and laid flat.

In one enablement of the first expression of the embodiment of FIGS. 1-5, the at-least-one surface groove 32 is substantially straight and is aligned substantially parallel to the longitudinal axis 22. In one variation, the at-least one surface groove 32 includes a plurality of spaced-apart surface grooves 32. Six surface grooves 32 are shown in FIG. 4-5. The number, depth, and width of the surface grooves 32 (and whether the grooves extend beyond the longitudinal ends of the surface portion) are design choices of the artisan to achieve a desired lubrication of MR fluid between the surface portion 30 and the cylinder 18. The length of the surface portion 30 relative to the length of the MR piston ring 20 and the height of the surface portion 30 above any unraised portion of the outer surface of the MR piston ring 20 are design choices of the artisan to achieve a desired damper performance.

Figure 6:
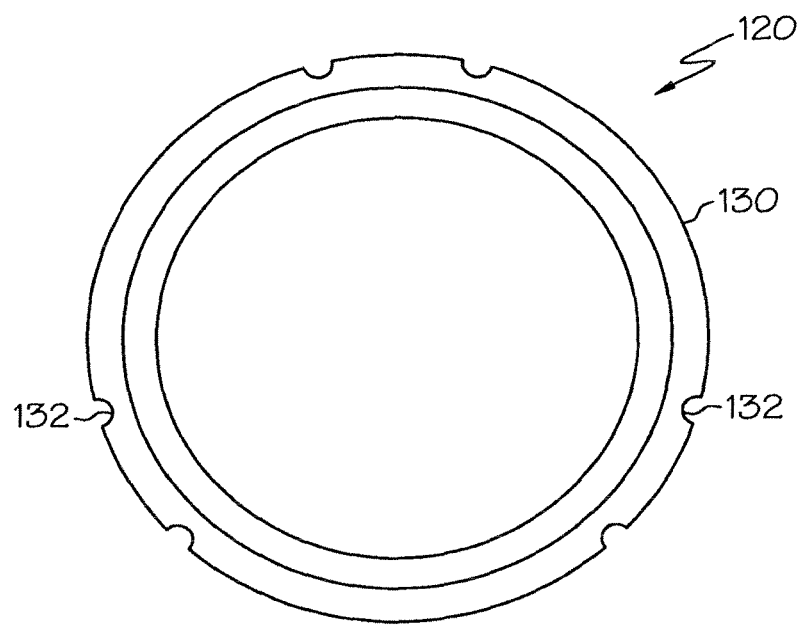
FIG. 6 is a longitudinal head-on view of the proximal end of an alternate embodiment of the MR piston ring of FIG. 1 wherein the at-least-one surface groove of the surface portion of the MR piston ring is tilted.
Figure 7:
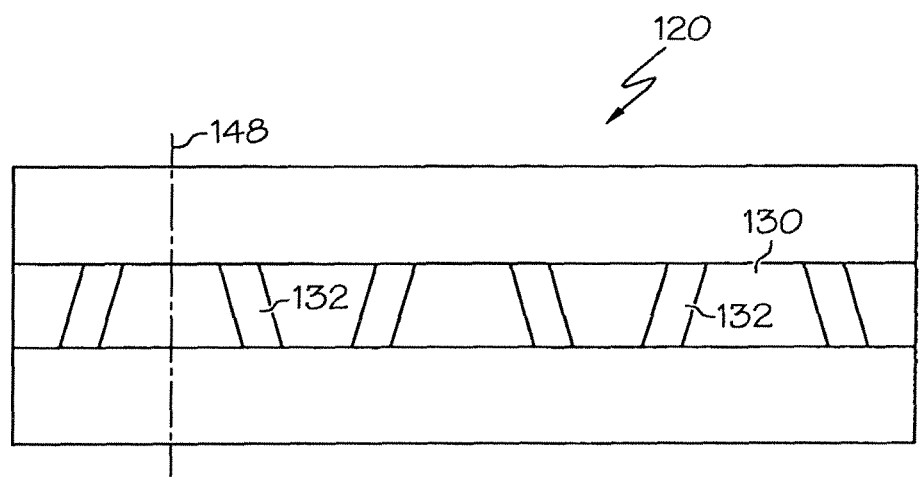
FIG. 7 is a view as in FIG. 5, but of the outer surface of the MR piston ring of FIG. 6.

In a different enablement, as shown in the alternate embodiment of the MR piston ring 120 of FIGS. 6-7, the at-least-one surface groove 132 is substantially straight and tilted with respect to a line 148 drawn on the surface portion 130 substantially parallel to the longitudinal axis 22 when the surface portion 130 is viewed as being longitudinally cut and laid flat. In one variation, the at-least-one surface groove 132 includes a plurality of spaced-apart surface grooves 132, wherein each circumferentially-sequential, odd-numbered surface groove (such as the first, third, and fifth surface groove 132 of FIG. 7 with the left-most surface groove of FIG. 7 being the first surface groove) is tilted with respect to the line 148 at a same predetermined angle, and wherein each circumferentially-sequential, even-numbered surface groove (such as the second, fourth, and sixth surface groove 132 of FIG. 7) is oppositely tilted with respect to the line 148 at the same predetermined angle.

The tilt angle, number, depth, and width of the surface grooves 132 (and whether the grooves extend beyond the longitudinal ends of the surface portion) are design choices of the artisan to achieve a desired lubrication of MR fluid between the surface portion 130 and the cylinder 18. The length of the surface portion 130 relative to the length of the MR piston ring 120 and the height of the surface portion 130 above any unraised portion of the outer surface of the MR piston ring 120 are design choices of the artisan to achieve a desired damper performance.

A second expression of the embodiment of FIGS. 1-5 is for a magnetorheological (MR) piston ring 20 including an MR-piston-ring body 50 disposable within a cylinder 18 of an MR damper 10 and having a central longitudinal axis 52 (seen on end as a dot in FIG. 4 and unseen but substantially coincident with the longitudinal axis 22 of the MR piston core 12 of FIG. 1). The MR-piston-ring body 50 has a radially inner surface 54 defining a boundary of a longitudinally-extending primary MR passageway 28. The MR-piston-ring body 50 includes a surface portion 30 which is slidingly engagable with the cylinder 18 and which has first and second longitudinal ends 24 and 26. The surface portion 30 includes at least one surface groove 32 each defining a secondary MR passageway 34 and extending from the first longitudinal end 24 to the second longitudinal end 26.

The enablements, variations, etc. of the first expression of the embodiments of FIGS. 1-5 and of 6-7 are equally applicable to the second expression of the embodiment of FIGS. 1-5.

Referring again to the drawings, FIGS. 8-10 and 2-3 show a second embodiment of the present invention. A first expression of the embodiment of FIGS. 8-10 and 2-3 is for a magnetorheological (MR) damper 210 including an MR piston core 12, first and second MR piston end plates 14 and 16, a cylinder 18, and an MR piston ring 220. The MR piston core 12 has a central longitudinal axis 22. The MR piston core 12 is disposed longitudinally between and attached to the first and second MR piston end plates 14 and 16. The MR piston ring 220 is substantially coaxially aligned with the longitudinal axis 22, is disposed within the cylinder 18, is attached to the first and second MR piston end plates 14 and 16, and is radially-outwardly spaced apart from the MR piston core 12 to define an MR passageway 228 between the MR piston core 12 and the MR piston ring 220. The MR piston ring 220 includes a surface portion 230 which is slidingly engagable with the cylinder 18 and which has first and second longitudinal ends 224 and 226. The surface portion 230 includes at least one surface groove 232 each defining an MR cavity 234 and extending from one of the first and second longitudinal ends 224 and 226 toward, but not to, the other of the first and second longitudinal ends 224 and 226.

Figure 8:
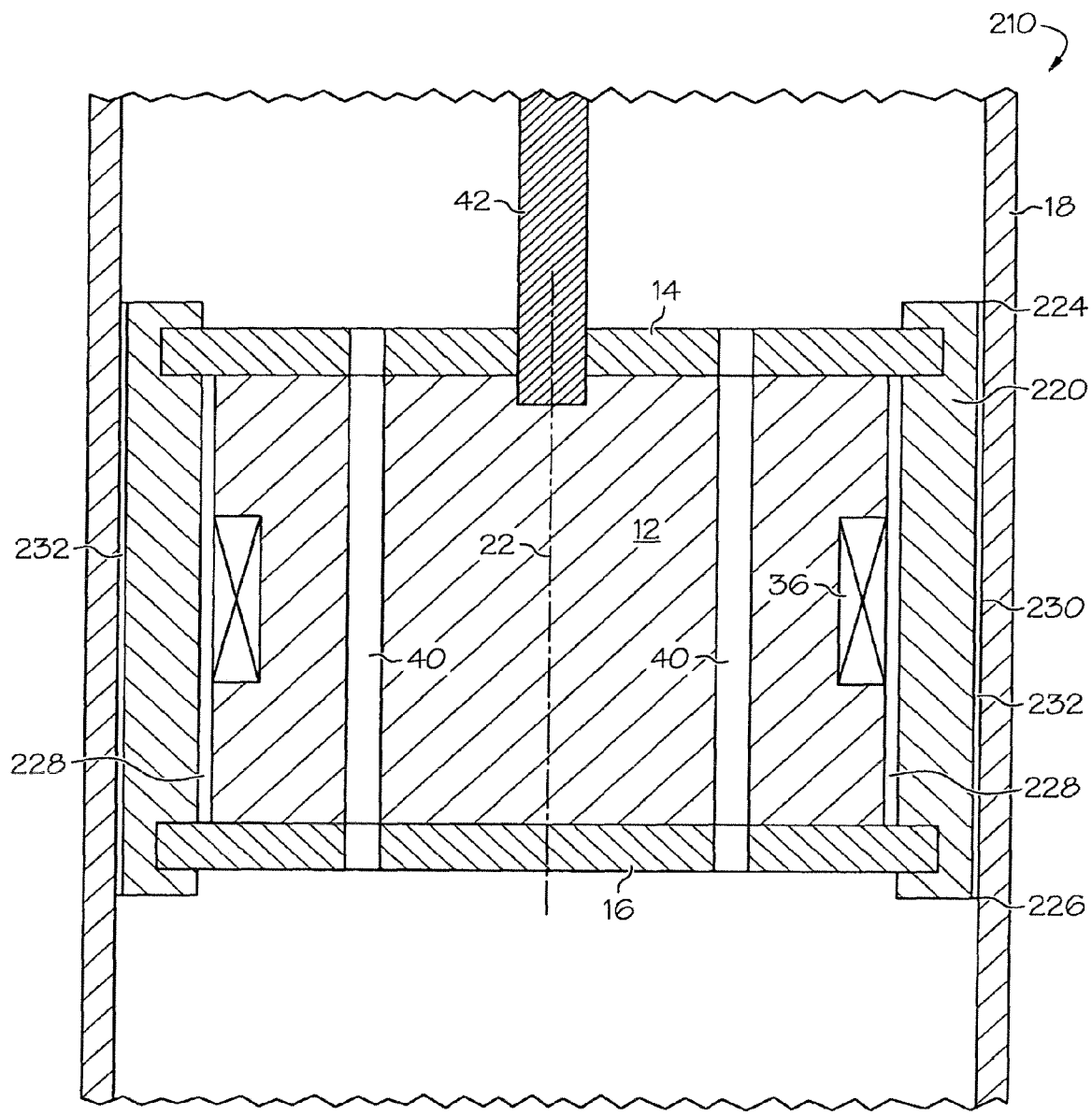
FIG. 8 is a schematic, cross-sectional view of a second embodiment of the invention showing a portion of an MR damper including an MR piston having an MR piston ring.
Figure 9:
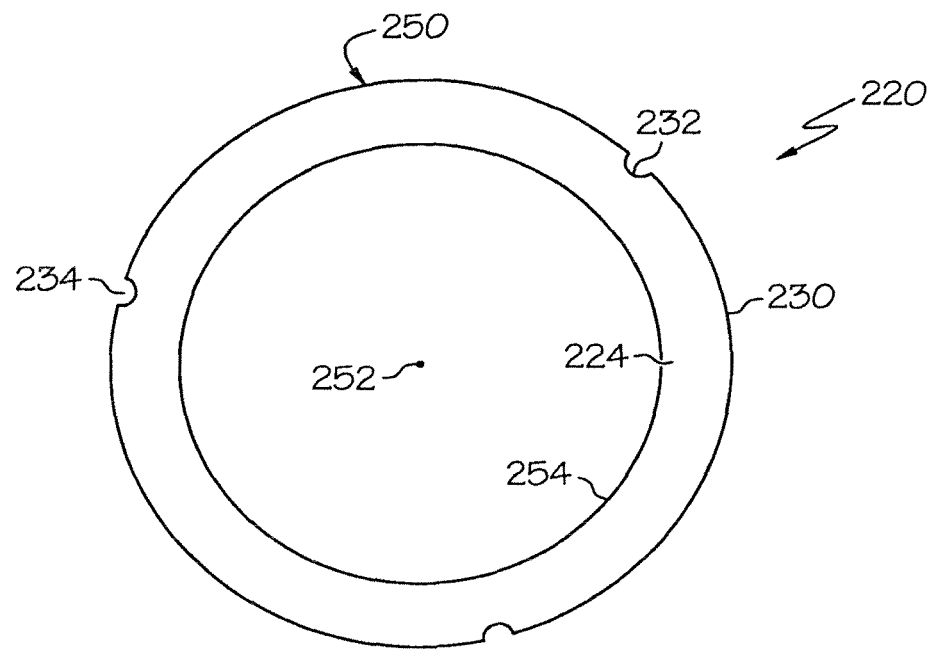
FIG. 9 is a longitudinal head-on view of the proximal end of the MR piston ring removed from the MR piston of FIG. 8.
Figure 10:
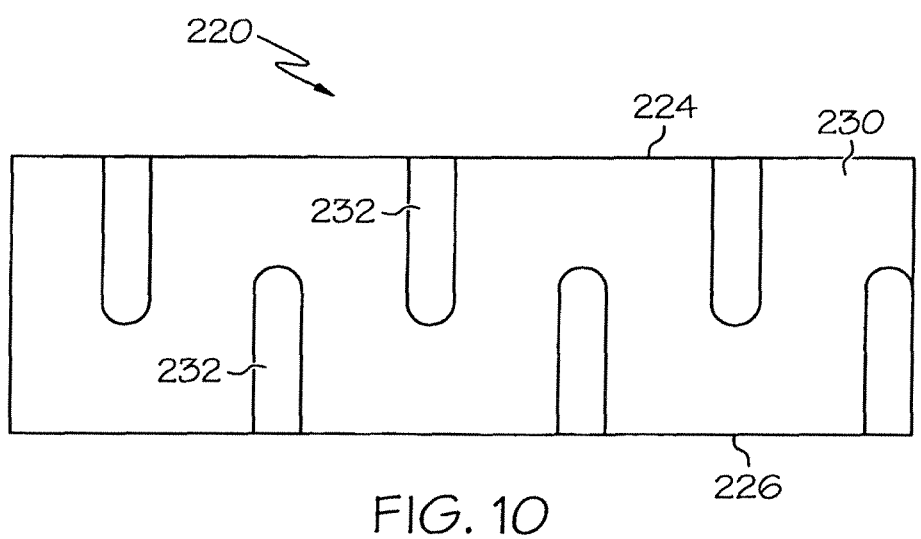
FIG. 10 is a view of the outer surface of the MR piston ring of FIG. 8 wherein the outer surface, which is the surface portion which is slidingly engagable with the cylinder, is viewed as being longitudinally cut and laid flat.

In one enablement of the first expression of the embodiment of FIGS. 8-10 and 2-3, the at-least-one surface groove 232 is substantially straight and is aligned substantially parallel to the longitudinal axis 22. In one variation, the at-least-one surface groove 232 includes a plurality of spaced-apart surface grooves 232, wherein each circumferentially-sequential, odd-numbered surface groove extends from the first longitudinal end 224, and wherein each circumferentially-sequential, even-numbered surface groove extends from the second longitudinal end 226. Six surface grooves 232 are shown in FIG. 10 and three of them are shown in FIG. 9. The number, depth, and width of the surface grooves 232 are design choices of the artisan to achieve a desired lubrication of MR fluid between the surface portion 230 and the cylinder 18. The length of the surface portion 230 relative to the length of the MR piston ring 220 and the height of the surface portion 230 above any unraised portion of the outer surface of the MR piston ring 220 are design choices of the artisan to achieve a desired damper performance. It is noted in the embodiment of FIGS. 8-10 that the surface portion 230 extends the entire length of the outer surface of the MR piston ring 220 and that the outer surface of the MR piston ring 220 has a substantially constant radius along its length.

Figure 11:
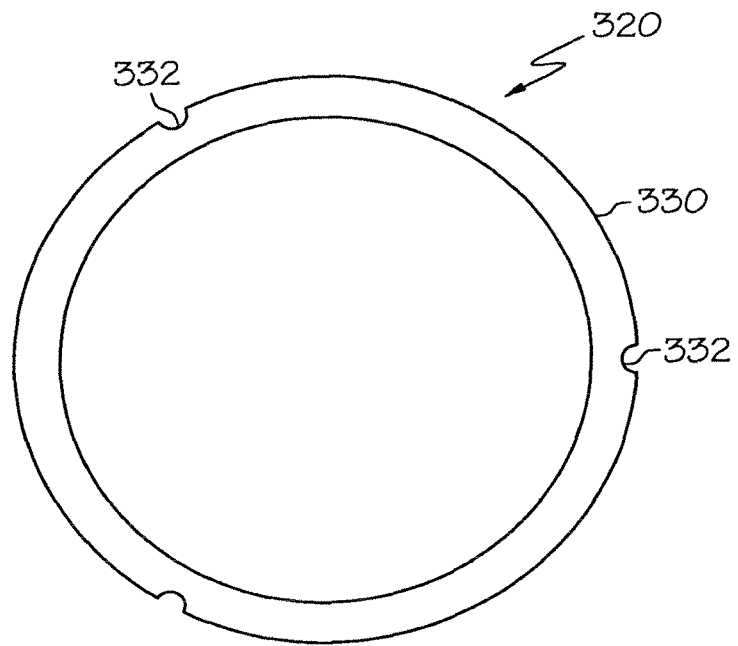
FIG. 11 is a longitudinal head-on view of the proximal end of an alternate embodiment of the MR piston ring of FIG. 8 wherein the at-least-one surface groove of the surface portion of the MR piston ring is tilted.
Figure 12:
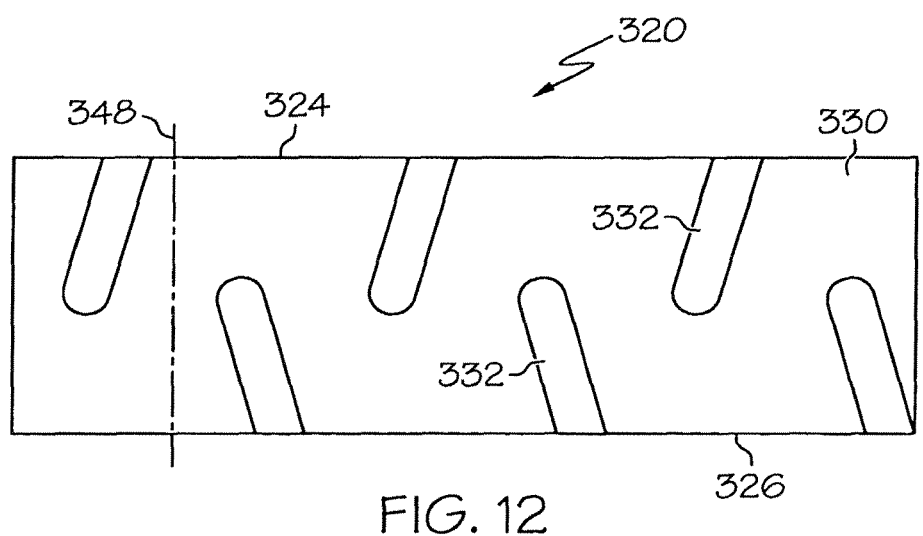
FIG. 12 is a view as in FIG. 10, but of the outer surface of the MR piston ring of FIG. 11.

In a different enablement, as shown in the alternate embodiment of the MR piston ring 320 of FIGS. 11-12, the at-least-one surface groove 332 is substantially straight and tilted with respect to a line 348 drawn on the surface portion 330 substantially parallel to the longitudinal axis 22 when the surface portion 330 is viewed as being longitudinally cut and laid flat. In one variation, the at-least-one surface groove 332 includes a plurality of spaced-apart surface grooves 332, wherein each circumferentially-sequential, odd-numbered surface groove (such as the first, third, and fifth surface groove 332 of FIG. 12 with the left-most surface groove of FIG. 12 being the first surface groove) extends from the first longitudinal end 324 and is tilted with respect to the line 348 at a same predetermined angle, and wherein each circumferentially-sequential, even-numbered surface groove (such as the second, fourth, and sixth surface groove 332 of FIG. 12) extends from the second longitudinal end 326 and is oppositely tilted with respect to the line 348 at the same predetermined angle.

The tilt angle, number, depth, and width of the surface grooves 332 are design choices of the artisan to achieve a desired lubrication of MR fluid between the surface portion 330 and the cylinder 18. The length of the surface portion 330 relative to the length of the MR piston ring 320 and the height of the surface portion 330 above any unraised portion of the outer surface of the MR piston ring 320 are design choices of the artisan to achieve a desired damper performance. It is noted in the embodiment of FIGS. 11-12 that the surface portion 330 extends the entire length of the outer surface of the MR piston ring 320 and that the outer surface of the MR piston ring 320 has a substantially constant radius along its length.

A second expression of the embodiment of FIGS. 8-10 and 2-3 is for a magnetorheological (MR) piston ring 220 including an MR-piston-ring body 250 disposable within a cylinder 18 of an MR damper 210 and having a central longitudinal axis 252 (seen on end as a dot in FIG. 9 and unseen but substantially coincident with the longitudinal axis 22 of the MR piston core of FIG. 8). The MR-piston-ring body 250 has a radially inner surface 254 defining a boundary of a longitudinally-extending MR passageway 228. The MR-piston-ring body 250 includes a surface portion 230 which is slidingly engagable with the cylinder 18 and which has first and second longitudinal ends 224 and 226. The surface portion 230 includes at least one surface groove 232 each defining an MR cavity 234 and extending from one of the first and second longitudinal ends 224 and 226 toward, but not to, the other of the first and second longitudinal ends 224 and 226.

The enablements, variations, etc. of the first expression of the embodiments of FIGS. 8-10 and 2-3 and of 11-12 are equally applicable to the second expression of the embodiment of FIGS. 8-10 and 2-3.

Several benefits and advantages are derived from one or more of the expressions of the first and second embodiments of the invention. In one example, the surface portion of MR piston ring which is slidingly engagable with the cylinder is lubricated by MR fluid in the at-least-one surface groove of the surface portion. Such lubrication of the surface portion reduces wear on the sliding surfaces when high side loads are applied to the MR damper. In the same or a different example, such lubrication reduces undesirable break down of the MR fluid caused by high side loads applied to the MR damper, as can be appreciated by those skilled in the art.

The foregoing description of several expressions of embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A magnetorheological (MR) damper assembly containing MR fluid comprising;
a cylinder defining a central longitudinal axis,
a first MR piston end plate,
a second MR piston end plate,
a MR piston core coaxially aligned with said central longitudinal axis and disposed longitudinally between and attached to said first MR piston end plate and said second MR piston end plate,
a piston ring attached to said first and second MR piston end plates and including a first longitudinal end adjacent said first MR piston end plate and a second longitudinal end adjacent said second MR piston end plate and said piston ring being disposed radially outwardly from said MR piston core to define a primary MR passageway therebetween,
a surface portion of said piston ring in sliding engagement with said cylinder defining at least one surface groove having a narrow circumferential extent and extending between said first and second longitudinal ends of said piston ring and being open to said first and second longitudinal ends of said piston ring and being substantially straight and tilted with respect to a line drawn on said surface portion parallel to said central longitudinal axis when said surface portion is viewed as being longitudinally cut and laid flat to provide a secondary MR passageway for receiving MR fluid and providing lubrication between said surface portion of said piston ring and said cylinder.

2. The magnetorheological (MR) damper assembly of claim 1 wherein said at least one surface groove extends from said first longitudinal end to said second longitudinal end.

3. The magnetorheological (MR) damper assembly of claim 1 wherein said at least one surface groove includes a plurality of spaced apart surface grooves.

4. The magnetorheological (MR) damper assembly of claim 3 wherein said plurality of spaced apart surface grooves are in circumferentially sequential spaced arrangement to define odd numbered surface grooves and even numbered surface grooves and each of said odd numbered surface grooves being tilted at a predetermined angle with respect to said line drawn on said surface portion and each of said even-numbered surface grooves being oppositely tilted at said predetermined angle with respect to said line drawn on said surface portion.

5. The magnetorheological (MR) damper assembly of claim 1 wherein said surface portion of said piston ring is raised radially outwardly with respect to said piston ring.

6. The magnetorheological (MR) damper assembly of claim 5 wherein said piston ring has a piston ring length defined by a distance measured between said first longitudinal end and said second longitudinal end and said surface portion extends along a surface portion length that is less than said piston ring length.

7. The magnetorheological (MR) damper assembly of claim 1 wherein said first MR piston end plate defines a plurality of orifices spaced radially outwardly from said central longitudinal axis and said second MR piston end plate defines a plurality of orifices spaced radially outwardly from said central longitudinal axis and said piston ring and said MR piston core defines said primary MR passageway in radial alignment with said orifices of said first and second MR piston end plates.

8. The magnetorheological (MR) damper assembly of claim 7 wherein said MR piston core includes an electric coil adapted for magnetically energizing MR fluid within said primary MR passageway.

9. The magnetorheological (MR) damper assembly of claim 8 wherein said first MR piston end plate defines a plurality of apertures spaced radially outwardly from said central longitudinal axis and radially inwardly from said orifices and said second MR piston end plate defines a plurality of apertures spaced radially outwardly from said central longitudinal axis and radially inwardly from said orifices and said MR piston core defines a plurality of non-MR passageways disposed radially inwardly from said electric coil and extending longitudinally through said MR piston core in radial alignment with said apertures of said first and second MR piston end plates.

10. The magnetorheological (MR) damper assembly of claim 9 wherein said first MR piston end plate defines a through hole co-axially aligned with said central longitudinal axis and said MR piston core defines a non-through hole co-axially aligned with said central longitudinal axis.

11. The magnetorheological (MR) damper assembly of claim 10 further comprising:
a piston rod co-axially aligned with said central longitudinal axis and attached to said MR piston core and extending through said through hole of said first MR piston end plate and into said non-through hole of said MR piston core.

12. A magnetorheological (MR) piston ring for slideably engaging a cylinder defining a central longitudinal axis, comprising;
a first longitudinal end extending perpendicularly to said central longitudinal axis, a second longitudinal end extending perpendicularly to said central longitudinal axis,
a surface portion extending between said first longitudinal end and said second longitudinal end defining at least one surface groove having a narrow circumferential extent and extending between said first and second longitudinal ends and being open to said first and second longitudinal ends and being substantially straight and tilted with respect to a line drawn on said surface portion parallel to said central longitudinal axis when said surface portion is viewed as being longitudinally cut and laid flat to provide a secondary MR passageway for receiving MR fluid and providing lubrication between said surface portion and the cylinder.

13. The magnetorheological (MR) piston ring of claim 12 wherein said at least one surface groove extends from said first longitudinal end to said second longitudinal end.

14. The magnetorheological (MR) piston ring of claim 12 wherein said at least one surface groove includes a plurality of spaced apart surface grooves.

15. The magnetorheological (MR) piston ring of claim 14 wherein said plurality of spaced apart surface grooves are in circumferentially sequential spaced arrangement to define odd numbered surface grooves and even numbered surface grooves and each of said odd numbered surface grooves being tilted at a predetermined angle with respect to said line drawn on said surface portion and each of said even-numbered surface grooves being oppositely tilted at said predetermined angle with respect to said line drawn on said surface portion.

16. The magnetorheological (MR) damper assembly of claim 12 wherein said surface portion is raised radially outwardly with respect to the piston ring.

17. The magnetorheological (MR) damper assembly of claim 16 wherein the piston ring has a piston ring length defined by a distance measured between said first longitudinal end and said second longitudinal end and said surface portion extends along a surface portion length that is less than said piston ring length.

* * * * *